United States Patent
Bengds et al.

(10) Patent No.: US 6,865,053 B2
(45) Date of Patent: Mar. 8, 2005

(54) SYSTEM AND METHOD OF CLEANING AN AUTOMATED TAPE LIBRARY WITH A PASS-THROUGH CLEANING TOOL USING CLEANING TAPE

(75) Inventors: Erik E. Bengds, Tucson, AZ (US); Kamal Emile Dimitri, Tucson, AZ (US); Jerry Walter Hammar, Tucson, AZ (US); Wayne Alan McKinley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 10/341,204

(22) Filed: Jan. 13, 2003

(65) Prior Publication Data

US 2004/0136112 A1 Jul. 15, 2004

(51) Int. Cl.[7] .............................................. G11B 15/68
(52) U.S. Cl. ....................... 360/92; 369/30.39; 369/191
(58) Field of Search ............................................ 360/92

(56) References Cited

U.S. PATENT DOCUMENTS

| | | |
|---|---|---|
| 3,789,452 A | 2/1974 | Nemoto |
| 4,408,241 A | 10/1983 | Ogawai |
| 4,624,593 A | 11/1986 | Humphries et al. |
| 4,631,615 A | 12/1986 | Grossman et al. |
| 4,674,000 A | 6/1987 | Lee |
| 4,692,830 A | 9/1987 | Willburger |
| 4,713,713 A | 12/1987 | Lu |
| 5,748,418 A | 5/1998 | Griffin et al. |
| 5,841,613 A | 11/1998 | DeMaster |
| 5,859,755 A | 1/1999 | Griffin |
| 6,212,036 B1 | 4/2001 | Todd |
| 6,414,816 B2 * | 7/2002 | Hikita ......................... 360/92 |
| 6,615,435 B2 * | 9/2003 | Randall ................. 15/104.002 |
| 2001/0010606 A1 | 8/2001 | Hikita |

FOREIGN PATENT DOCUMENTS

JP          2000048450 A     2/2000

* cited by examiner

*Primary Examiner*—A. J. Heinz
(74) *Attorney, Agent, or Firm*—Jean M. Barkley; Dillon & Yudell LLP (57) ABSTRACT

A cleaning system for cleaning a picker in an automated media library includes a removable cleaning cartridge. The cleaning cartridge contains cleaning tape that is automatically advanced. The cleaning cartridge has a window through which access to the cleaning tape is provided. The picker has rollers that must be periodically cleaned of debris. The picker is aligned with a designated cleaning bin and one of the rollers is placed in contact with the cleaning tape. The roller then wipes against the cleaning tape. After the roller is cleaned, the cleaning tape advances so that a clean, unused portion of the cleaning tape is available through the window. The cleaning cartridge is extracted from the bin so that another roller can be cleaned. After each roller is cleaned, the cleaning cartridge is returned to the bin, and the picker returns to picking and placing media cartridges until another cleaning operation is required.

26 Claims, 9 Drawing Sheets

SYSTEM AND METHOD OF CLEANING AN AUTOMATED TAPE LIBRARY WITH A PASS-THROUGH CLEANING TOOL USING CLEANING TAPE

BACKGROUND OF THE INVENTION

1. Technical Field

The present invention relates in general to maintaining data storage devices, and in particular to an improved system and method of cleaning an automated tape library with a disposable and reusable pass-through cleaning tool.

2. Description of the Prior Art

Data storage drives, such as data tape drives, record information to and read information from media, such as the data tape of a tape cartridge. Data storage drives are often used in conjunction with, for example, a data storage and retrieval system. One example of such a system is an automated library with robotic picking devices, wherein removable media cartridges are selectively transported between storage and media drives in an automated environment. Once requested, data that is stored on data storage media of an automated data storage library typically is needed quickly. Thus, it is desirable that an automated data storage library be maintained in an operational condition on a continuous basis as much as possible. As a result, customer expectations have moved toward a concept of continuous availability, such as the well known "24×7×365" availability. For example, some automated data storage libraries contain two accessors for improved speed and redundancy. If one accessor fails, another accessor may take over in its place.

In the prior art, the robotic accessors used to manipulate the cartridges are typically required to access a test station or service bay that is located within the confines of the library in order to test and/or calibrate the cartridge grippers (e.g., for the type of cartridge used in the library). Some libraries use dedicated storage slots within the normal operational space of the library. These may be storage slots that could otherwise be used for customer storage, or they may be dedicated diagnostic slots that never contain customer media. In dual accessor libraries, one problem with this approach is that library operation may have to be interrupted in order to calibrate or test a gripper. This is because the accessor performing the calibration or test operation may be in the way of the other accessor. Still other libraries may use a special dedicated service area with fixed slots or features. For example, dual accessor libraries commonly use two of these dedicated service areas, with one service area being located at each end of the library. This allows one of the accessors to calibrate or test its grippers without interfering with the operation of the other accessor.

As the performance requirements of tape drives has continued to increase, the grippers used to engage the tape cartridges have become more susceptible to damage due to wear of the components. In particular, pass-through picker rollers and/or pickers with belts are designed to move cartridge media from one position to another. The rollers are usually made out of rubber-type material that, with time, can breakdown by wear and can generate debris. On occasion, the debris tends to accumulate on the rollers and can affect reliability of the system, including the ability of the system to move the media. Once the rollers are contaminated, they can cause errors in loading and unloading procedures by reducing the coefficient of friction. These circumstances can create a significant field problem since adverse operating conditions can accelerate the degradation of performance. Thus, an improved system and method of cleaning cartridge handling equipment is needed to reduce the risk of decreased performance and damage to the overall library system.

SUMMARY OF THE INVENTION

One embodiment of a cleaning system for cleaning the picker in an automated media library is disclosed. The cleaning system is located in a dedicated cleaning bin in a storage wall and includes a removable cleaning cartridge. The cleaning cartridge contains a roll of cleaning tape that is advanced by an automated tape advance system. The components for driving the cleaning tape are located in the cleaning bin and detachable from the cleaning cartridge itself. The cleaning cartridge has a window through which access to the cleaning tape is provided.

The picker has rollers that must be periodically cleaned of debris and the like in order to maintain the adequate performance of the picker. The picker is first aligned with the designated cleaning bin. One of the rollers is placed in contact with the cleaning tape through the window. The roller is then rotated so that the surface of the roller wipes against the cleaning tape while a resilient backing material maintains contact therebetween. After the roller is cleaned, the cleaning tape is advanced by a tape advance motor so that a clean, unused portion of the cleaning tape is available through the window. The removable cleaning cartridge is extracted from the cleaning bin so that another roller can be aligned and in contact with the cleaning tape so that it may be cleaned. This process is repeated for the remaining rollers on the opposite or lower side of the picker by inverting the cleaning cartridge with the picker. After each of the rollers is cleaned, the cleaning cartridge is returned to the cleaning bin, and the picker returns to picking and placing the media cartridges until another cleaning operation is required.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE PRESENT INVENTION

Figure 1:
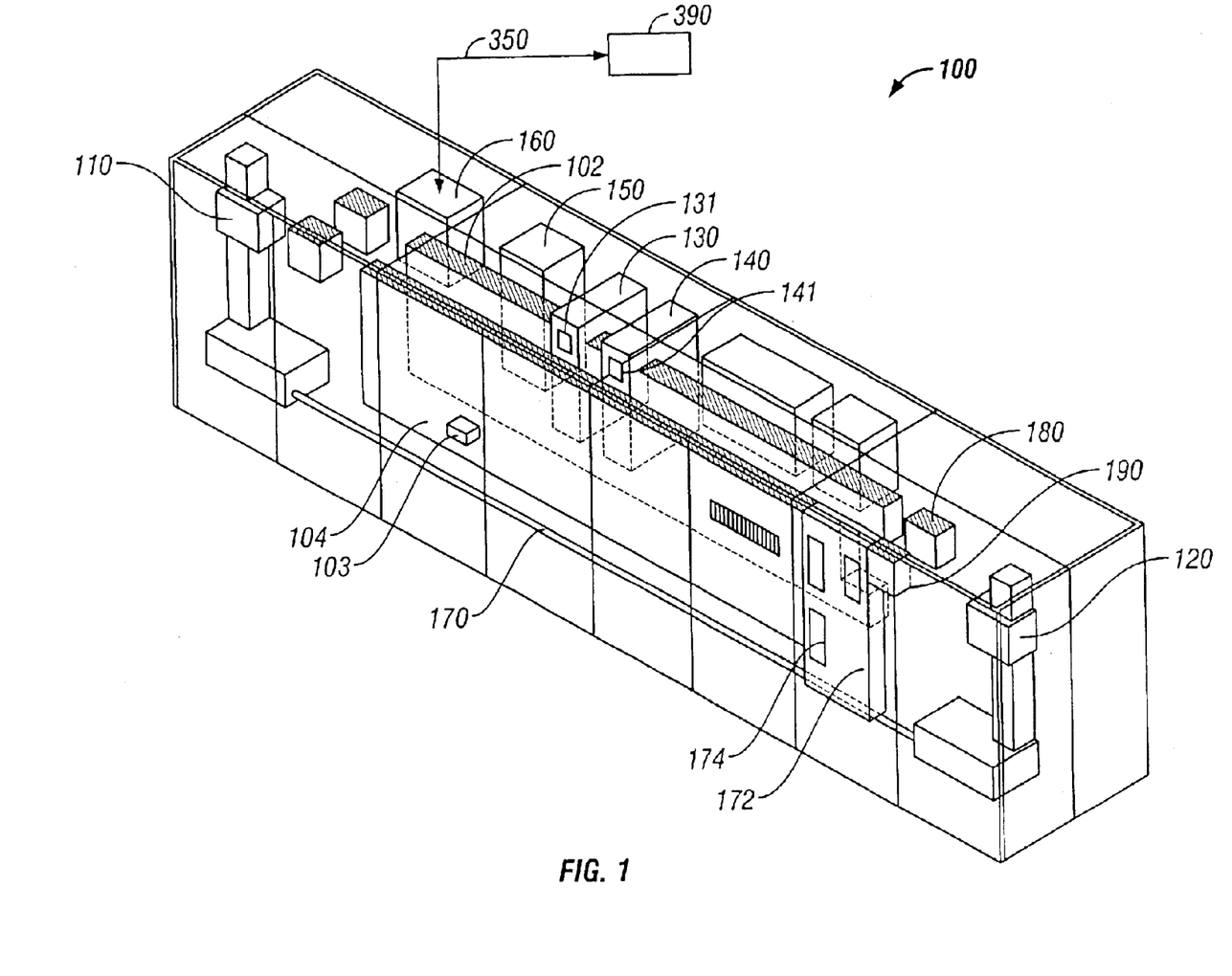
FIG. 1 is an isometric view of one embodiment of a data storage and retrieval system or library constructed in accordance with the present invention.

Referring to FIG. 1, a data storage and retrieval system 100 is shown. In the embodiment illustrated, data storage and retrieval system 100 is depicted as a robotic library. However, data storage and retrieval system 100 also may comprise other systems as well, such as a Network Attached Storage (NAS) subsystem of one or more Redundant Array of Independent Disks (RAID).

The upper interface of controller 160 allows data storage and retrieval system 100 to communicate with one or more hosts 390 via link 350. Link 350 may comprise a Gigabit Ethernet, Infiniband, TCP/IP, Fibre Channel, SCSI, ESCON, FICON, or the like, depending on the application. The lower interface of controller 160 communicates with a plurality of drives that are in drive enclosures 130 and 140. Drive enclosures 130 and 140 receive removable media cartridges 103 via robotic pickers 110 and 120, which include a bar code scanner or the like for reading cartridge labels, or other means for identifying the cartridges. The removable media cartridges 103 may contain magnetic tape, optical tape, optical disk media, magneto-optical disk, CD, DVD, phase-change media, floppy disk, removable hard disk, electronic media, and the like. Robotic pickers 110 and 120 travel along rail 170 to move removable media cartridges 103 from inner storage wall 102 and outer storage wall 104 to drive enclosures 130 and 140 for the purposes of reading and/or writing data. Robotic pickers 110 and 120 also return the removable media cartridges 103 to storage walls 102 and 104.

An import/export station 172 includes access door 174 attached to the side of data storage and retrieval system 100. Access door 174 is preferably pivotally attached to the side of data storage and retrieval system 100; however, access door 174 could be slidably or otherwise attached. An operator panel or access station 150 permits a user to communicate directly with data storage and retrieval system 100. The operator access station 150 typically contains an LCD display, a keyboard or touch screen for user input, and circuits to monitor and control the I/O station doors.

First power component 180 and second power component 190 each comprise one or more power supplies that supply power to pickers 110 and 120, controller 160, operator access station 150, and drive enclosures 130 and 140 of data storage and retrieval system 100. Typically, at least one of the power components 180 and 190 provides direct current (DC) power, since most computer peripheral devices use DC power. One of the power components 180 and 190 may provide alternating current (AC) power as well. Controller 160 is in communication with power components 180 and 190, pickers 110 and 120, operator access station 150, drive enclosures 130 and 140, and tape drives (see FIG. 2) of data storage and retrieval system 100.

Figure 2:
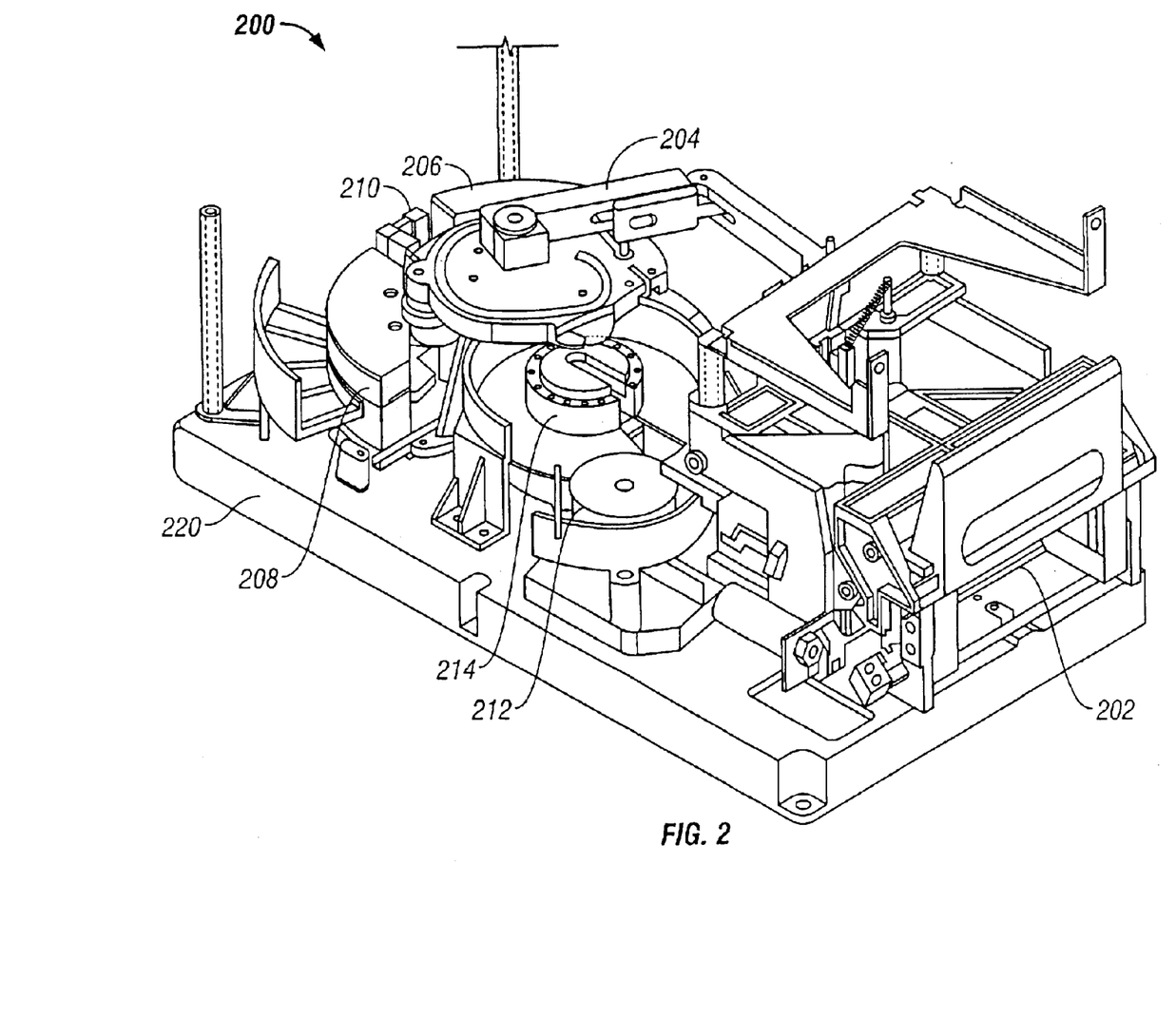
FIG. 2 is an isometric view of a tape drive utilized by the library of FIG. 1.

Referring now to FIG. 2, a typical reel-to-reel tape drive 200 is shown. A plurality of tape drives 200 are usually located inside of the robotic library 100 of FIG. 1. Tape drive 200 may be any one of, for example, a family of tape drives using a single-reel tape cartridge, such as the IBM 3480, IBM 3490, IBM 3590, DLT, and Linear Tape Open (LTO) tape drives. Cartridge loader 202 receives a single-reel tape cartridge and threader 204 threads the leader-block of the tape around the tape guides 206 and 208, and around the tape tension transducer 212, and into the take-up reel 214. Tape guides 206 and 208 support the tape as the tape moves over the magnetic tape head 210. All of these components are supported by base plate 220. One or more tape drives 200 are located inside drive enclosures 130, 140 (FIG. 1) in order to protect the tape drives 200 from dust and debris, as well as extraneous air currents that could disturb the way the magnetic tape passes over the magnetic head 210.

Figure 3:
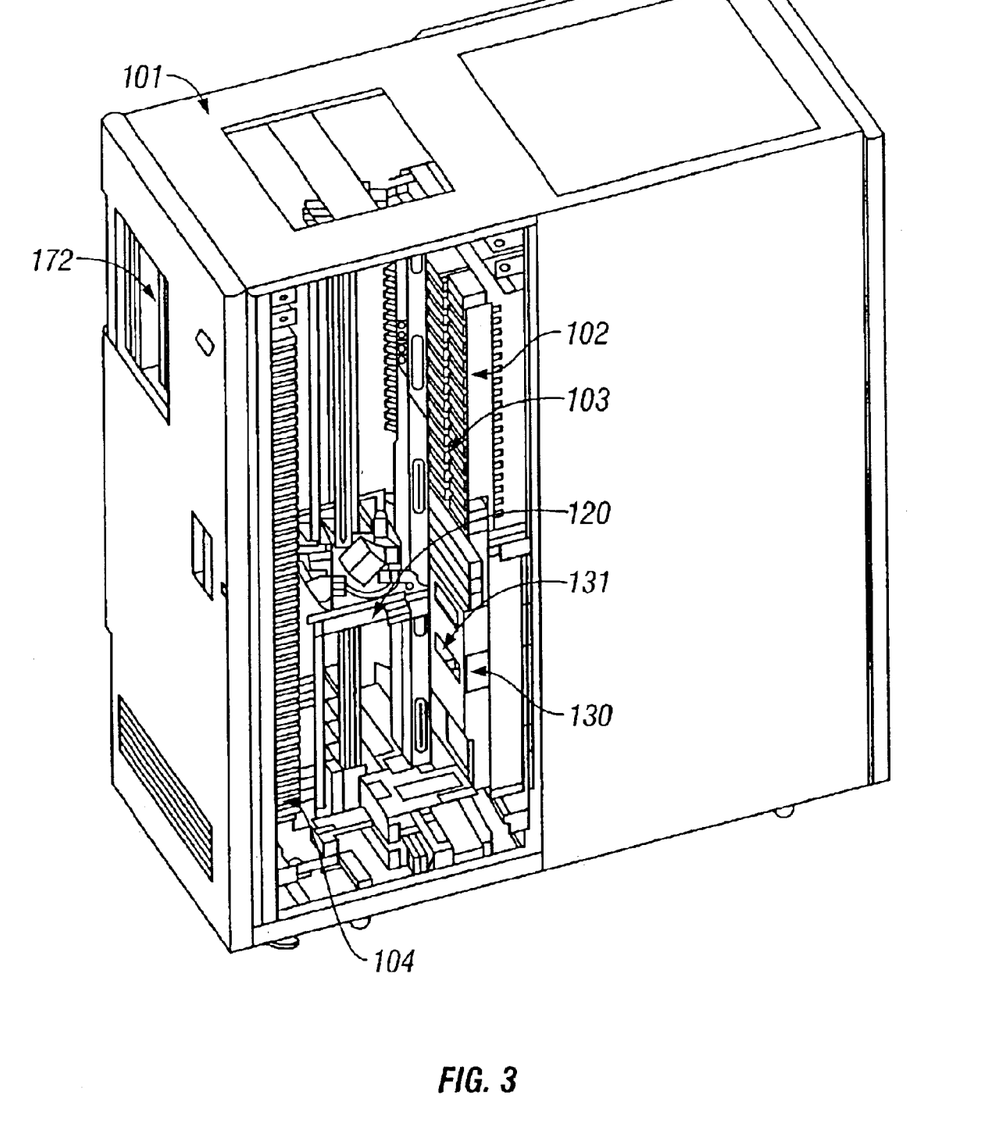
FIG. 3 is an isometric view of a storage module utilized by the library of FIG. 1.

The data storage and retrieval system 100 of FIG. 1 is typically assembled from a series of frames or storage modules 101, such as the L-frame type storage module illustrated in FIG. 3. The desired number of storage modules 101 are assembled into data storage and retrieval system 100. Storage module 101 has picker 120, a drive enclosure 130, an inner storage wall 102, and an outer storage wall 104. A plurality of removable storage media 103 are located in bins in each storage wall 102, 104. Removable storage media 103 are typically tape cartridges, but may also be other types of media such as those described above. Removable storage media 103 are inserted via robotic pickers 110, 120 into drive enclosures 130, 140 via entrances 131, 141, respectively, where removable storage media 103 (e.g., cartridges) are mounted inside the tape drive, such as tape drive 200 (FIG. 2).

In the version shown, each picker 110, 120 comprises a pass-through picker assembly (FIG. 4) which, for simplicity, is shown without grippers or rollers. Pass-through picker assembly 120 has a carrier or cage 401 which, in the version shown, comprises a hollow rectangular conduit for receiving, carrying, and transporting individual ones of the cartridges 103 between the bins 405 of storage walls 102, 104. Cage 401 is mounted to a pair of rails 403 by which the cage 401 moves vertically, while rail 170 (FIG. 1) allows the picker 120 to move horizontally via robotic control. The bins 405 may be provided as standard media storage bins or dedicated for exclusive use in a cleaning process and system, as will be described below.

Figure 5:
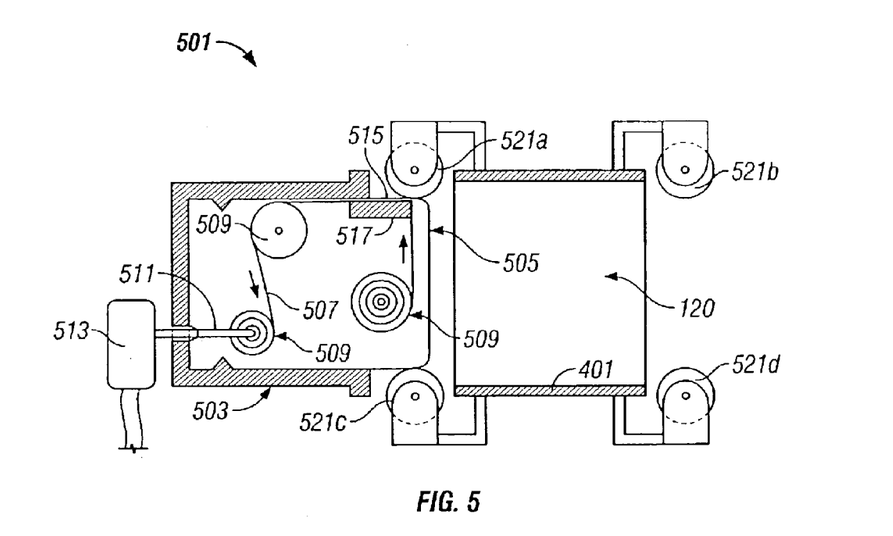
FIG. 5 is a side view of one embodiment of a cleaning system utilized by the storage module of FIG. 4 for the library of FIG. 1 and is constructed in accordance with the present invention, and is shown with a cleaning tape cartridge prior to engagement by a picker.
Figure 6:
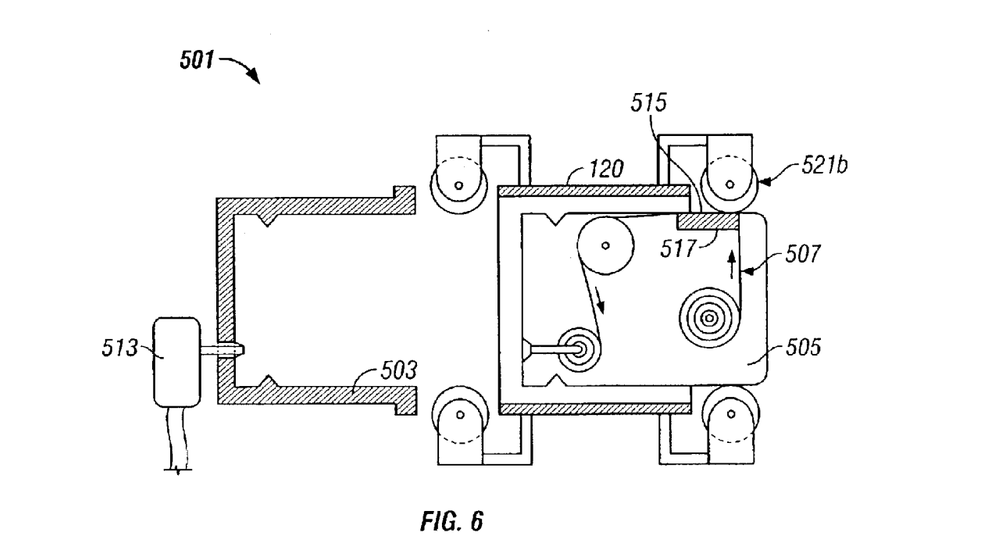
FIG. 6 is a side view of the cleaning system of FIG. 5 and is shown with the picker engaging the cleaning tape cartridge.

Referring now to FIGS. 5 and 6, a first embodiment of a cleaning system 501 for cleaning picker 120 is shown. In this version, cleaning system 501 is located in a dedicated cleaning bin 503 in one of the storage walls 102, 104. Cleaning system 501 includes a removable cleaning cartridge 505. Cleaning cartridge 505 is a "pass-through" cleaning tool in the sense that it is removed from cleaning bin 503 and passed through picker 120 for cleaning purposes. Both cleaning bin 503 and cleaning cartridge 505 have dimensions that are substantially identical to those of the standard media bins and the media cartridges 103, respectively. Cleaning cartridge 505 has a cartridge body containing cleaning tape 507 that is spooled on a set of reels and pulleys 509.

In one version, cleaning tape 507 comprises a pressure sensitive adhesive made of an acrylate, rubber, silicone, or a combination thereof on a polymer support layer. Examples of these materials include but are not limited to poly(2-ethylhexyl acrylate), poly(butyl acrylate), poly(isoprene), poly(butylene), and poly(dimethylsiloxane). Polymer support materials include but are not limited to polyesters such as poly(ethylene terephthalate), poly(propylene terephthalate), poly(ethylene naphthalate), poly(butylene terephthalate), polyimides, polyamides, poly(vinyl chloride), and poly(vinyl acetate).

Cleaning cartridge 505 also has a tape advance gear 511 that is connected to one of the reels 509 for advancing the cleaning tape 507. Gear 511 is actuated by a tape advance motor 513 which is located adjacent to cleaning bin 503. Tape advance motor 513 may be located inside or outside of cleaning bin 503 and cleaning cartridge 505. In the embodiment shown, cleaning cartridge 505 has a window 515 through which access to cleaning tape 507 is provided. In this version, cleaning tape 507 is reinforced by a stable backing material 517 when it is accessed through window 515.

In operation, picker 120 has at least one picker roller 521 (four shown) that must be periodically cleaned of debris and the like in order to maintain the performance of the picker 120. In this version of cleaning system 501, cleaning cartridge 505 has only one window 515, so only one roller 521 can be cleaned at a time. However, cleaning cartridge 505 may be configured with a plurality of windows 515, each of which would provide access to cleaning tape 507 so that multiple rollers 521 can be cleaned simultaneously.

As an overview, the system of the present invention has a parked position such that the cleaning cartridge 505 is located in the cleaning bin 503 and is disengaged with respect to the picker roller 521. The system also has at least one cleaning position such that at least a portion of the cleaning cartridge 505 extends out of the cleaning bin 503 and is engaged with respect to the picker roller 521 to clean the picker roller 521 when the picker 120 is located adjacent to the cleaning bin 503 by contacting the picker roller 521 with the cleaning tape 507 in the window 515 and rotating the picker roller 521 to wipe against the cleaning tape 507 so that the entire contacting surface of the picker roller 521 is cleaned.

In the embodiment shown, picker 120 is robotically aligned with the designated cleaning bin 503 as the cleaning process is initiated. One of the rollers 521, such as roller 521a (FIG. 5) is placed in contact with cleaning tape 507 through window 515. Roller 521a is then rotated so that the contact surface of roller 521a wipes against cleaning tape 507 while the resilient backing material 517 maintains contact therebetween. After roller 521a is cleaned, the cleaning tape 507 is advanced by tape advance motor 513 through gear 511 and rollers 509 so that a clean, unused portion of cleaning tape 507 is available through window 515 for the next roller 521 to be cleaned. Alternatively, roller 521a may be used to advanced the cleaning tape 507. Next, the removable cleaning cartridge 505 is completely extracted from cleaning bin 503 and passed through the picker 120 so that another roller 521 (e.g., roller 521b of FIG. 6) is aligned and in contact with the cleaning tape and is thereby cleaned. This process is repeated for the remaining rollers 521c and 521d on the opposite or lower side of picker 120 by simply inverting cleaning cartridge 505 with picker 120 or other means so that its window 515 may align with the other rollers 521. After all of the rollers 521 are cleaned, the cleaning cartridge 505 is returned to cleaning bin 503, and the picker 120 returns to picking and placing media cartridges 103 until another cleaning operation is required.

The need to clean picker 120 may be detected and/or repeated in many different ways. For example, the picker 120 may go to cleaning system 501 to be cleaned at routine intervals such as after a specified number of cycles, periods of time, or during periods of inactivity so as to not interrupt the system during routine operations. Alternatively, picker 120 may be cleaned after at least one failed attempt to pick a media cartridge 103. For example, after three failed attempts to pick a desired media cartridge 103, the picker 120 would go a cleaning station such as cleaning system 501, get cleaned, and then return to the same media cartridge 103 to try to pick it once again. If picker 120 is then successful in picking the same media cartridge 103, the picker 120 would be deemed "clean" and routine operations would continue. However, if the picker is unsuccessful at picking the same media cartridge 103 after picker 120 has been cleaned, something else is most likely wrong with the system and maintenance is notified.

Figure 4:
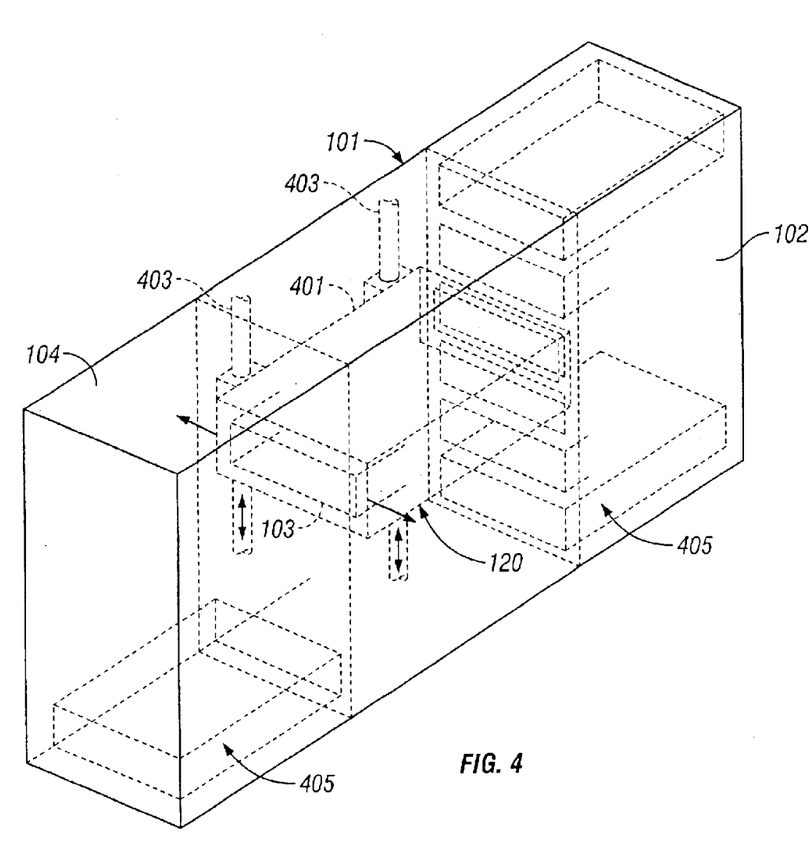
FIG. 4 is a schematic isometric view of the storage module of FIG. 3.
Figure 7:
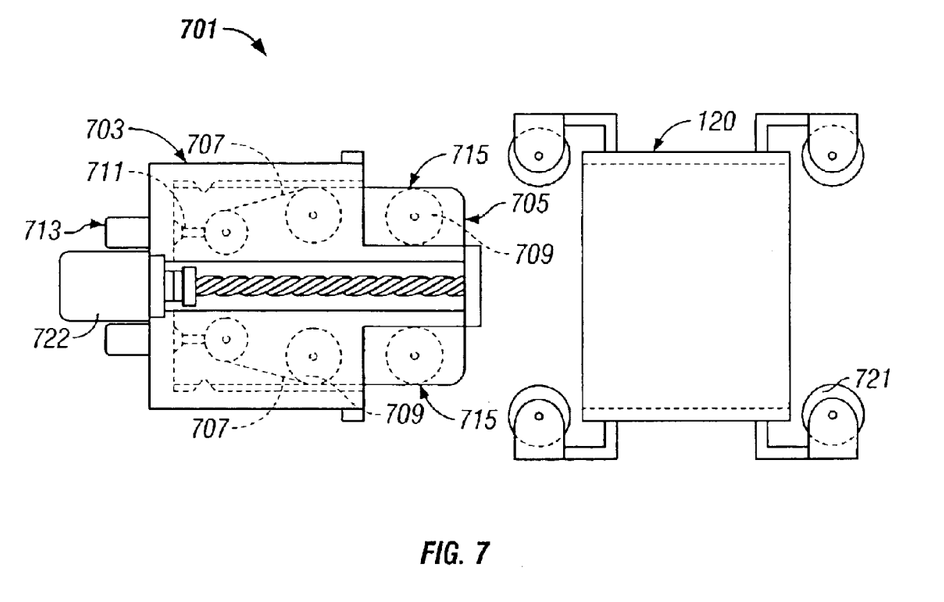
FIG. 7 is a side view of another embodiment of a cleaning system utilized by the storage module of FIG. 4 for the library of FIG. 1 and is constructed in accordance with the present invention, and is shown with a cleaning tape cartridge prior to engagement by a picker.
Figure 8:
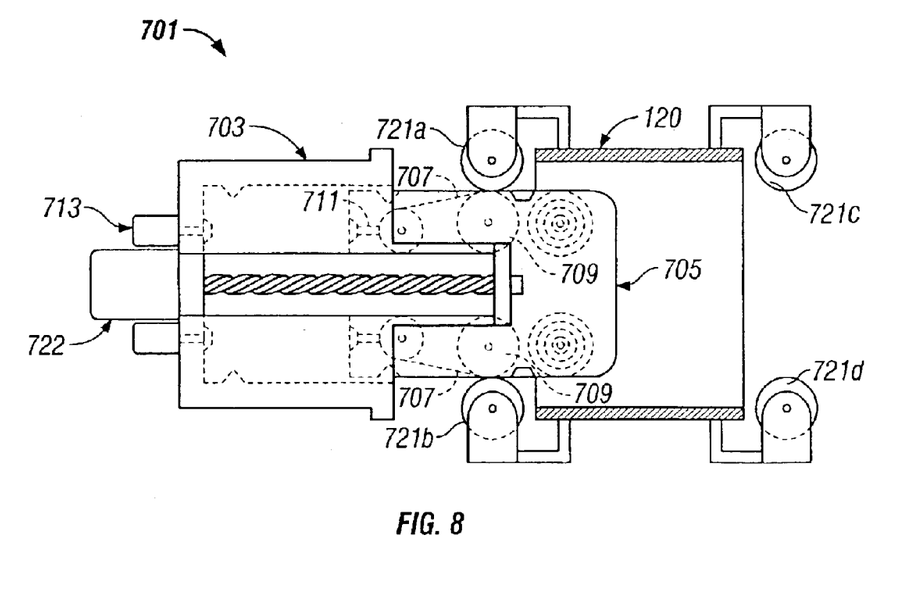
FIG. 8 is a side view of the cleaning system of FIG. 7 and is shown with a portion of the picker engaging the cleaning tape cartridge.
Figure 9:
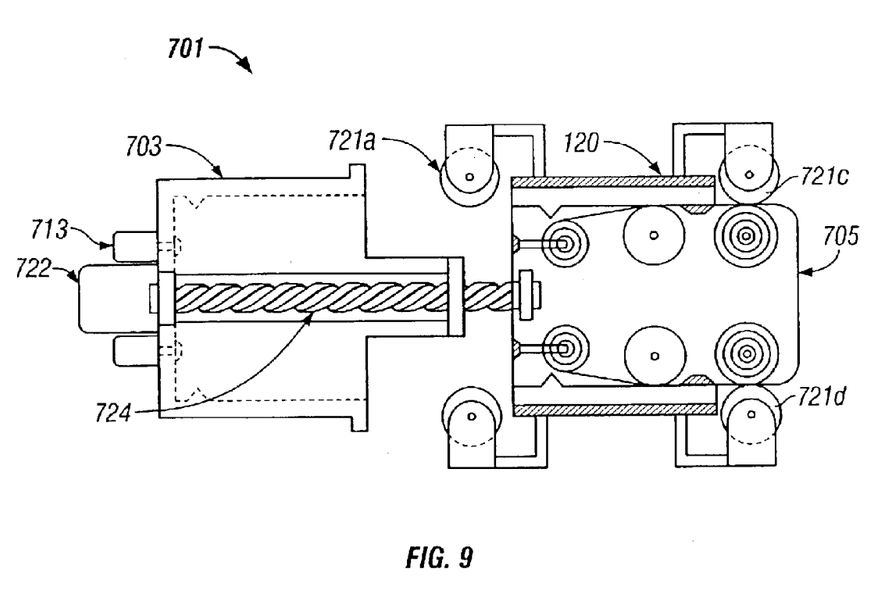
FIG. 9 is a side view of the cleaning system of FIG. 7 and is shown with a different portion of the picker engaging the cleaning tape cartridge.

Referring now to FIGS. 7–9, another embodiment of a cleaning system 701 for cleaning picker 120 is shown. Cleaning system 701 and cleaning system 501 share many similarities. In this version, cleaning system 701 is also located in a dedicated cleaning bin 703 in one of the storage walls 102, 104 (FIG. 4). Cleaning system 701 includes a removable cleaning cartridge 705. Both cleaning bin 703 and cleaning cartridge 705 have dimensions that are substantially identical to those of the standard media bins and the media cartridges 103, respectively. Cleaning cartridge 705 has a cartridge body containing cleaning tape 707 that is spooled on a set of reels and/or rollers 709. Cleaning tape 707 is identical to cleaning tape 507. In one version, rollers 709 comprise an elastomer comprising, for example, natural rubber, poly(isoprene), poly(butylene), poly(chloroprene), a terpolymer of ethylene, propylene, and diene monomers commonly known as EPDM rubber, butyl nitrile rubber, polyurethane, polysiloxanes, or combinations thereof.

Cleaning cartridge 705 also has at least one tape advance gear 711 (two shown) that is connected to one of the reels 709 for advancing the cleaning tape 707. Gear 711 is actuated by a tape advance motor 713 (two shown) which is located adjacent to cleaning bin 703. In the embodiment shown, cleaning cartridge 705 has a pair of opposed windows 715 through which access to cleaning tape 707 is provided. In this version, cleaning tape 707 is reinforced by rollers 709, but also may be reinforced by a stable backing material (not shown) when it is accessed through windows 715.

In operation, picker 120 has a plurality of picker rollers 721 (four shown) that must be periodically cleaned in order to maintain the performance of the picker 120. In this version of cleaning system 701, cleaning cartridge 705 has only two windows 715, so only two of the rollers 721 can be cleaned at a time. However, cleaning cartridge 705 may be configured with additional windows 715, each of which would provide access to cleaning tape 507 so that additional rollers 721 can be cleaned simultaneously. As described above for the previous embodiment, the cleaning system 701 of the present invention includes a parked position and at least one cleaning position.

In the embodiment shown, picker 120 is robotically aligned with the designated cleaning bin 703 as the cleaning process is initiated. Two of the rollers 721, such as rollers 721a and 721b (FIG. 8) are placed in contact with cleaning tape 707 through windows 715. In this version, cleaning cartridge 705 is moved partially out of cleaning bin 703 and into picker 120 via a lead screw motor 722 and lead screw 724 to accomplish this portion of the cleaning. Rollers 721a and 721b are then rotated so that their surfaces wipe against cleaning tape 707 while the resilient rollers 709 maintain contact therebetween.

After rollers 721a and 721b are cleaned, cleaning cartridge 705 is returned to cleaning bin 703 (in this version) via lead screw motor 722, and the cleaning tape 707 is advanced by tape advance motors 713 through gears 711 and rollers 709 so that a clean, unused portion of cleaning tape 707 is available through windows 715. Alternatively, rollers 721a and 721b may advance the cleaning tape 707. Next, the removable cleaning cartridge 705 is further extracted from cleaning bin 703 so that the remaining rollers 721c and 721d (FIG. 9) are aligned and in contact with the cleaning tape 707 and may be cleaned. With this version of the present invention, inverting the cleaning cartridge 705 is optional. After each of the rollers 721 are cleaned, the cleaning cartridge 705 is returned to cleaning bin 703, tape 707 is advanced, and the picker 120 returns to picking and placing media cartridges 103 until another cleaning operation is required.

Figure 10:
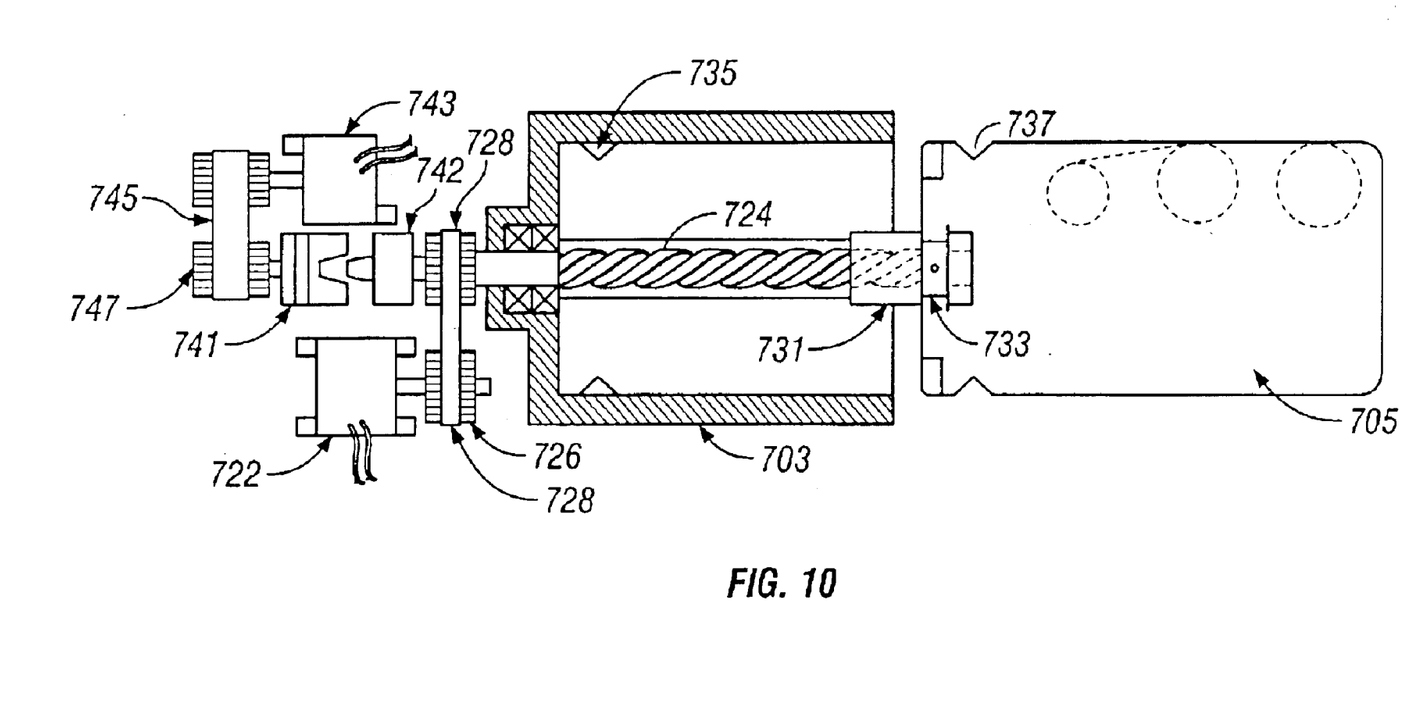
FIG. 10 is a side view of the cleaning system of FIG. 7 illustrating additional details of the present invention.
Figure 11:
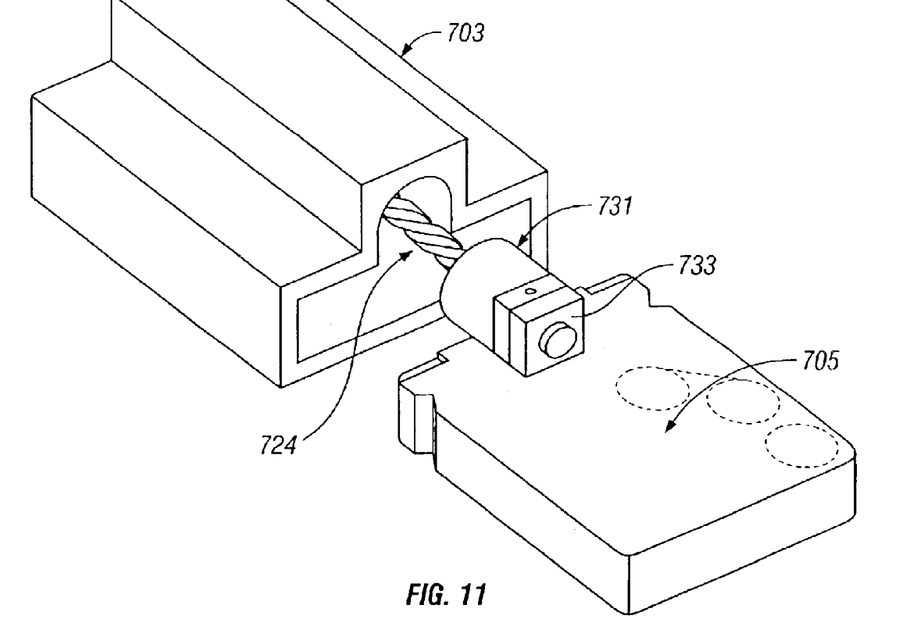
FIG. 11 is a front isometric view of the cleaning system of FIG. 7 illustrating additional details of the present invention.
Figure 12:
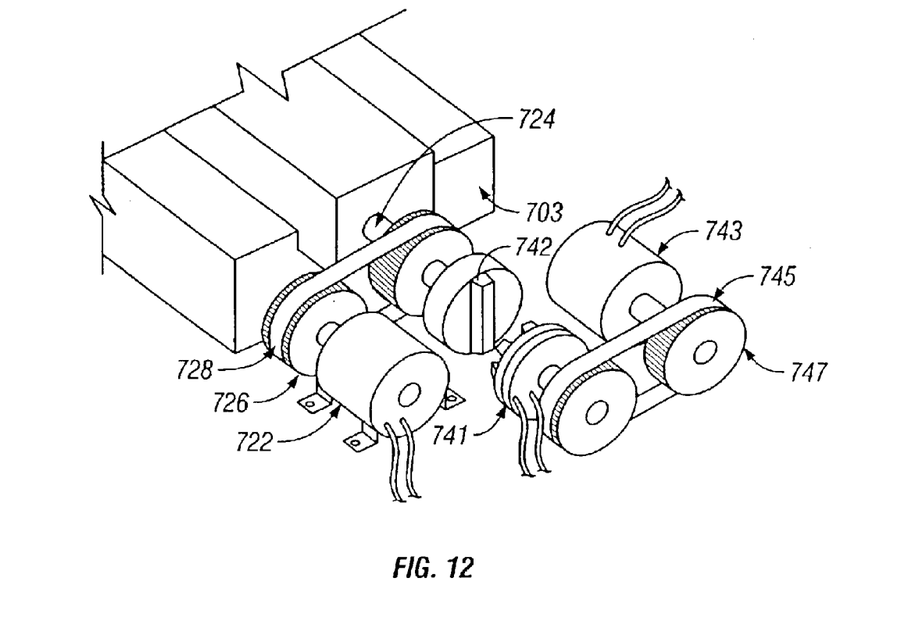
FIG. 12 is a rear isometric view of the cleaning system of FIG. 7 illustrating additional details of the present invention.

One version of the details of some of the features of cleaning system 701 are shown in FIGS. 10–12. As described previously, cleaner cartridge 705 is extended out of and retracted into cleaner bin 703 via a lead screw 724 which is driven by the lead screw motor 722. Motor 722 and lead screw 724 have pulleys 726 that are joined by a belt 728. The distal portion of lead screw 724 is stabilized by a support bushing 731 which slides in a slot along with the cleaner cartridge 705 via attachment point 733 as cleaning cartridge 705 is moved. Cleaner bin 703 also has internal cartridge retention tabs 735 for engaging recesses 737 on cartridge 705 in the parked position. The proximal end of lead screw 724 includes duplex support bearings. Cleaning system 701 is also capable of pivoting the cleaner cartridge 705 by rotating (flipping) it 180 degrees, if desired, to provide additional access the picker rollers 721 on both sides of the picker 120. The cartridge 705 is rotated when a clutch 741 engages the end 742 of the lead screw 724. The clutch 741 is interconnected to a flip motor 743 via a belt 745 and pulleys 747.

The present invention has several advantages as a preventive maintenance tool and/or a cleaning tool that is used when performance decreases. A cleaning system constructed in accordance with the present invention utilizes a cleaning cartridge or cassette that is generally configured in the shape of a typical media cartridge. The cleaning cartridge preferably has one-way rotation of the cleaning tape or a one-way indexing system. The cleaning cartridge brings a continuously fresh piece of cleaning material into contact with the contaminated rollers. The cleaning material advances from a spool containing a padded cleaning roll of material. Material choices may comprise a thin rubber or acrylic type material with or without a foam liner. This tool is preferably used in an automated manner via a input/output station in the library, but can also be used in a manual system. The cleaning tape retains any collected debris inside the cleaning cartridge.

When the cleaning system and method of the present invention is used in the regular maintenance of the library, missed loads and missed picks are avoided, thus reducing user downtime. When the roll of cleaning tape is completely used or depleted, it can be disposed of or replenished. Alternatively, the system can utilize an enhancement to the cleaning process by using a two-step tool that removes debris and then applies a different, wet rolling material to clean the residue left over from the first step.

While the invention has been shown or described in only some of its forms, it should be apparent to those skilled in the art that it is not so limited, but is susceptible to various changes without departing from the scope of the invention.

What is claimed is:

1. A system for cleaning a picker in an automated media library having a storage wall with a plurality of media bins, media cartridges located in the media bins, and the picker having a picker roller for picking and placing the media cartridges, the system comprising:

a cleaning bin in the storage wall of the automated library;

a cleaning cartridge removably mounted in the cleaning bin, the cleaning cartridge having a cleaning tape exposed to an exterior of the cleaning cartridge;

a tape advance apparatus located adjacent to the cleaning bin for advancing the cleaning tape so that a clean, unused portion of the cleaning tape is available to clean the picker roller; and wherein the system has a parked position such that the cleaning cartridge is located in the cleaning bin and is disengaged with respect to the picker roller, and a cleaning position such that at least a portion of the cleaning cartridge extends out of the cleaning bin and is engaged with respect to the picker roller to clean the picker roller when the picker is located adjacent to the cleaning bin by contacting the picker roller with the cleaning tape and rotating the picker roller to wipe against the cleaning tape.

2. The system of claim 1, wherein the picker roller advances the cleaning tape when the system is in the cleaning position.

3. The system of claim 1, wherein the cleaning cartridge is completely extracted from the cleaning bin and passed through the picker when the system is in the cleaning position in order to clean the picker roller.

4. The system of claim 1, wherein, after the picker roller is cleaned, the cleaning cartridge is returned to the cleaning bin in the parked position, and the picker returns to picking and placing media cartridges until another cleaning operation is required.

5. The system of claim 1, wherein both the cleaning bin and the cleaning cartridge have dimensions that are substantially identical to dimensions of the media bins and the media cartridges, respectively.

6. The system of claim 1, wherein the cleaning cartridge has a plurality of windows, each of which provides access to at least a portion of the cleaning tape from an exterior of the cleaning cartridge for simultaneously cleaning a plurality of picker rollers.

7. The system of claim 1, wherein the cleaning bin is dedicated to exclusive use by the cleaning system.

8. The system of claim 1, wherein the cleaning cartridge comprises a plurality of cleaning tapes to simultaneously clean a plurality of picker rollers.

9. The system of claim 1, further comprising a lead screw connected to the cleaning bin and the cleaning cartridge for extending and retracting the cleaning cartridge relative to the cleaning bin between the parked and cleaning positions.

10. The system of claim 9, wherein the cleaning cartridge is rotated relative to the cleaning bin by the lead screw in order to invert the cleaning cartridge for cleaning additional picker rollers.

11. The system of claim 10, further comprising a clutch for engaging the lead screw, the clutch being interconnected to a flip motor via a belt and pulleys for inverting the cleaning cartridge.

12. An automated media library, comprising:
a storage wall having a plurality of media bins, media cartridges located in the media bins, and a drive for reading and writing data to the media cartridges;
a picker having a plurality of picker rollers for picking and placing the media cartridges between the media bins and the drive;
a cleaning bin in the storage wall;
a cleaning cartridge removably mounted in the cleaning bin, the cleaning cartridge having
a cleaning tape, a window for exposing the cleaning tape to an exterior of the cleaning cartridge, and a tape advance gear for advancing the cleaning tape;
a tape advance motor located adjacent to the cleaning bin for engaging the tape advance gear to advance the cleaning tape so that a clean, unused portion of the cleaning tape is available through the window to clean the picker rollers; and wherein
the automated media library has a parked position such that the cleaning cartridge is located in the cleaning bin and is disengaged with respect to the picker rollers, and a cleaning position such that at least a portion of the cleaning cartridge extends out of the cleaning bin and is engaged with respect to at least one of the picker rollers to clean said at least one of the picker rollers when the picker is located adjacent to the cleaning bin by contacting said at least one of the picker rollers with the cleaning tape in the window and rotating the picker roller to wipe against the cleaning tape.

13. The automated media library of claim 12, wherein said at least one of the picker rollers advances the cleaning tape while the automated media library is in the cleaning position.

14. The automated media library of claim 12, wherein the cleaning cartridge is completely extracted from the cleaning bin while the automated media library is in the cleaning position in order to clean said at least one of the picker rollers.

15. The automated media library of claim 12, wherein, after said at least one of the picker rollers is cleaned, the cleaning cartridge is returned to the cleaning bin in the parked position, and the picker returns to picking and placing media cartridges until another cleaning operation is required.

16. The automated media library of claim 12, wherein both the cleaning bin and the cleaning cartridge have dimensions that are substantially identical to dimensions of the media bins and the media cartridges, respectively.

17. The automated media library of claim 12, wherein the cleaning cartridge has a plurality of windows, each of which provides access to at least a portion of the cleaning tape so that more than one of the plurality of picker rollers can be cleaned simultaneously.

18. The automated media library of claim 12, wherein the cleaning cartridge comprises a plurality of cleaning tapes, windows, and tape advance gears for advancing the cleaning tapes to simultaneously clean more than one of the plurality of picker rollers.

19. The automated media library of claim 12, further comprising a lead screw connected to the cleaning bin and the cleaning cartridge for extending and retracting the cleaning cartridge relative to the cleaning bin between the parked and cleaning positions.

20. The automated media library of claim 19, wherein the cleaning cartridge is rotated relative to the cleaning bin by the lead screw in order to invert the cleaning cartridge for cleaning other ones of the plurality of picker rollers.

21. The automated media library of claim 19, further comprising a clutch for engaging the lead screw, the clutch being interconnected to a flip motor via a belt and pulleys for inverting the cleaning cartridge.

22. A method of cleaning automated media library, comprising:
providing a storage wall having a plurality of media bins, media cartridges in the media bins, a drive for reading and writing data to the media cartridges, a picker having a plurality of picker rollers for picking and placing the media cartridges between the media bins and the drive, a cleaning bin, and a cleaning cartridge having cleaning tape in the cleaning bin;
aligning the picker with the cleaning bin;
contacting at least one of the picker rollers with the cleaning tape of the cleaning cartridge;
rotating said at least one of the picket rollers to wipe against the cleaning tape; and
advancing the cleaning tape to a clean, unused portion of the cleaning tape.

23. The method of claim 22, wherein the advancing step comprises advancing the cleaning tape with said at least one of the picket rollers.

24. The method of claim 22, further comprising the steps of extending and reacting the cleaning cartridge with respect to the cleaning bin in order to engage and disengage the picker rollers.

25. The method of claim 22, wherein more than one of the plurality of picker rollers are cleaned simultaneously.

26. The method of claim 22, further comprising the step of inverting the cleaning cartridge to clean other ones of the plurality of picker rollers.

* * * * *